United States Patent
Subramanian et al.

(10) Patent No.: US 11,349,171 B2
(45) Date of Patent: May 31, 2022

(54) TWIST-LOCK BATTERY PACK ATTACHMENT DEVICE

(71) Applicant: FORD GLOBAL TECHNOLOGIES, LLC, Dearborn, MI (US)

(72) Inventors: Rajaram Subramanian, Ann Arbor, MI (US); Patrick Daniel Maguire, Ann Arbor, MI (US); Rohit Gunna, Novi, MI (US); Steve Droste, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1245 days.

(21) Appl. No.: 15/251,392

(22) Filed: Aug. 30, 2016

(65) Prior Publication Data
US 2016/0372725 A1    Dec. 22, 2016

Related U.S. Application Data

(62) Division of application No. 14/467,467, filed on Aug. 25, 2014, now Pat. No. 9,461,286.

(51) Int. Cl.
*H01M 50/20* (2021.01)
*B60K 1/04* (2019.01)

(52) U.S. Cl.
CPC ............... *H01M 50/20* (2021.01); *B60K 1/04* (2013.01); *H01M 2220/20* (2013.01)

(58) Field of Classification Search
CPC .. H01M 2/1077; H01M 10/04; H01M 2/1083; H01M 2220/20; H01M 50/20; B60K 1/04
See application file for complete search history.

(56) References Cited

U.S. PATENT DOCUMENTS

| | | | | |
|---|---|---|---|---|
| 2,896,990 | A | * | 7/1959 | Garvey ................... E05B 81/22 292/201 |
| 3,372,523 | A | * | 3/1968 | Hall, Jr. ................. E04B 1/4157 52/336 |
| 8,550,633 | B2 | | 10/2013 | Martin |
| 2002/0162690 | A1 | | 11/2002 | Maus et al. |

(Continued)

FOREIGN PATENT DOCUMENTS

CN    102815190    12/2012
CN    103108762    5/2013

(Continued)

OTHER PUBLICATIONS

JP 2010-196789 JPO Abstract Sep. 2010.*
JP 2010-196789 English Machine Translation Printed Jan. 23, 2019.*

*Primary Examiner* — Cynthia H Kelly
*Assistant Examiner* — Aaron J Greso
(74) *Attorney, Agent, or Firm* — David B. Kelley; Carlson, Gaskey & Olds, P.C.

(57) ABSTRACT

An exemplary method of securing a battery array includes attaching a twist-lock to a case, and securing a battery array to the case by rotating the twist-lock from a first position to a second position. Another exemplary method of securing a battery array includes securing a twist-lock to a case, and rotating the twist-lock from a first position to a second position where a portion of a battery array is clamped between the twist-lock and the case.

20 Claims, 8 Drawing Sheets

(56) References Cited

U.S. PATENT DOCUMENTS

| | | | |
|---|---|---|---|
| 2002/0162696 A1* | 11/2002 | Maus | B60K 1/04 |
| | | | 180/68.5 |
| 2008/0053716 A1* | 3/2008 | Scheucher | B60L 8/00 |
| | | | 180/2.1 |
| 2009/0305116 A1* | 12/2009 | Yang | H01M 2/0212 |
| | | | 429/61 |
| 2012/0161472 A1 | 6/2012 | Rawlinson et al. | |
| 2012/0230762 A1 | 9/2012 | Ruff | |
| 2012/0255800 A1* | 10/2012 | Lejeune | B60K 1/04 |
| | | | 180/68.5 |
| 2013/0180791 A1* | 7/2013 | Lejeune | B60K 1/04 |
| | | | 180/68.5 |
| 2013/0298586 A1* | 11/2013 | Hwang | B60K 1/04 |
| | | | 62/239 |

FOREIGN PATENT DOCUMENTS

| | | | | |
|---|---|---|---|---|
| CN | 203466237 | | 3/2014 | |
| DE | 102012202164 | | 8/2013 | |
| EP | 1703145 | | 9/2006 | |
| JP | 2010-196789 | * | 9/2010 | ............ B60K 1/04 |
| WO | 2011083228 | | 7/2011 | |
| WO | WO 2011083220 | * | 7/2011 | ............ H01M 2/10 |

* cited by examiner

TWIST-LOCK BATTERY PACK ATTACHMENT DEVICE

CROSS-REFERENCE TO RELATED APPLICATIONS

This application is a divisional of U.S. application Ser. No. 14/467,467, which is incorporated herein by reference.

BACKGROUND

Generally, electrified vehicles differ from conventional motor vehicles because electrified vehicles include one or more electric machines powered by batteries. The electric machines can selectively drive the vehicle. Conventional motor vehicles, in contrast to electrified vehicles, are driven exclusively by an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

A powertrain of an electrified vehicle is typically equipped with a battery pack having battery cells that store electrical power for powering the electric machine. The battery cells are arranged in arrays of multiple battery cells. The arrays are secured within a case of the battery pack.

SUMMARY

A method of securing a battery array according to an exemplary aspect of the present disclosure includes, among other things, attaching a twist-lock to a case, and securing a battery array to the case by rotating the twist-lock from a first position to a second position.

In a further non-limiting embodiment of the foregoing method, the twist-lock in the first position permits movement of the battery array to and from an installed position within the case, and the twist-lock in the second position secures the battery array in the installed position.

In a further non-limiting embodiment of any of the foregoing methods, the battery array is a first battery array and the rotating further secures a second battery array to the case.

A further non-limiting embodiment of any of the foregoing methods includes clamping a foot of the battery array against the case during the rotating.

In a further non-limiting embodiment of any of the foregoing methods, the twist-lock directly contacts the battery array during the securing.

In a further non-limiting embodiment of any of the foregoing methods, the battery array is clamped between the twist-lock and the case when the twist-lock is securing the battery array to the case.

In a further non-limiting embodiment of any of the foregoing methods, attaching the twist-lock to the case comprises attaching the twist-lock to a tray of the case.

In a further non-limiting embodiment of any of the foregoing methods, attaching the twist-lock to the case comprises positioning a fastener within an aperture of the twist-lock, the fastener separate and distinct from the twist-lock.

In a further non-limiting embodiment of any of the foregoing methods, the securing is after the attaching.

In a further non-limiting embodiment of any of the foregoing methods, the securing comprises positioning a portion of the case within a groove at an end of the twist-lock.

In a further non-limiting embodiment of any of the foregoing methods, the portion is a first portion of a first case, and the groove is at a first end of the twist-lock. The method further comprises securing a second portion of a second case during the securing by positioning the second portion of the second case within another groove at a second end of the twist-lock, the first end opposite the second end.

In a further non-limiting embodiment of any of the foregoing methods, the portion is a foot.

A method of securing a battery array according to another exemplary embodiment includes, among other things, securing a twist-lock to a case, and rotating the twist-lock from a first position to a second position where a portion of a battery array is clamped between the twist-lock and the case.

In a further non-limiting embodiment of the foregoing method, the rotating is after the securing.

In a further non-limiting embodiment of any of the foregoing methods, the portion is received within a groove at an end of the twist-lock when the battery array is clamped between the twist-lock and the case.

In a further non-limiting embodiment of any of the foregoing methods, the securing comprises securing the twist-lock to a tray of the case.

In a further non-limiting embodiment of any of the foregoing methods, the portion is a foot.

In a further non-limiting embodiment of any of the foregoing methods, the foot is recessed entirely beneath a plurality of battery cells of the battery array.

In a further non-limiting embodiment of any of the foregoing methods, the twist-lock directly contacts the portion when in the second position.

In a further non-limiting embodiment of any of the foregoing methods, no portion of the battery array is positioned between case and the battery array when the twist-lock is in the first position such that the twist-lock in the first position permits movement of a battery array to and from an installed position within a battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to securing portions of a battery pack and, more particularly, to securing arrays of battery cells using a twist-lock device to, among other things, reduce a packaging footprint.

Figure 1:
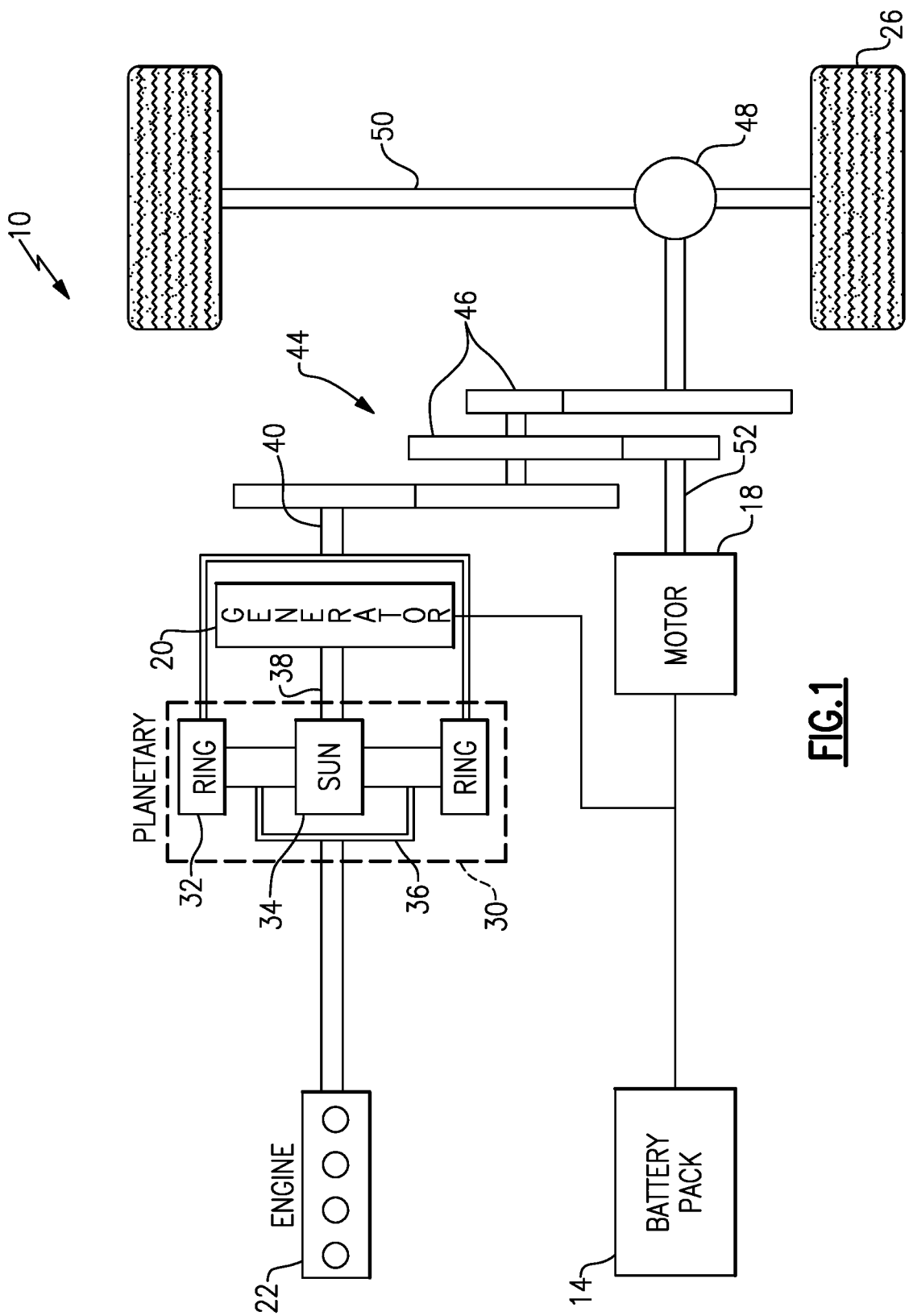
FIG. 1 is a schematic view of an example electrified vehicle powertrain.

FIG. 1 schematically illustrates a powertrain 10 for a hybrid electric vehicle (HEV). The powertrain 10 includes a battery pack 14, a motor 18, a generator 20, and an internal combustion engine 22.

The motor 18 and generator 20 are types of electric machines. The motor 18 and generator 20 may be separate or may have the form of a combined motor-generator.

In this embodiment, the powertrain 10 is a power-split powertrain system that employs a first drive system and a second drive system. The first and second drive systems generate torque to drive one or more sets of vehicle drive wheels 26 of the electric vehicle. The first drive system includes a combination of the engine 22 and the generator 20. The second drive system includes at least the motor 18, the generator 20, and the battery pack 14. The motor 18 and the generator 20 are portions of an electric drive system of the powertrain 10.

The engine 22, which is an internal combustion engine in this example, and the generator 20 may be connected through a power transfer unit 30, such as a planetary gear set. Of course, other types of power transfer units, including other gear sets and transmissions, may be used to connect the engine 22 to the generator 20. In one non-limiting embodiment, the power transfer unit 30 is a planetary gear set that includes a ring gear 32, a sun gear 34, and a carrier assembly 36.

The generator 20 can be driven by engine 22 through the power transfer unit 30 to convert kinetic energy to electrical energy. The generator 20 can alternatively function as a motor to convert electrical energy into kinetic energy, thereby outputting torque to a shaft 38 connected to the power transfer unit 30. Because the generator 20 is operatively connected to the engine 22, the speed of the engine 22 can be controlled by the generator 20.

The ring gear 32 of the power transfer unit 30 can be connected to a shaft 40, which is connected to vehicle drive wheels 26 through a second power transfer unit 44. The second power transfer unit 44 may include a gear set having a plurality of gears 46. Other power transfer units may also be suitable. The gears 46 transfer torque from the engine 22 to a differential 48 to ultimately provide traction to the vehicle drive wheels 26. The differential 48 may include a plurality of gears that enable the transfer of torque to the vehicle drive wheels 26. In this example, the second power transfer unit 44 is mechanically coupled to an axle 50 through the differential 48 to distribute torque to the vehicle drive wheels 26.

The motor 18 can also be employed to drive the vehicle drive wheels 26 by outputting torque to a shaft 52 that is also connected to the second power transfer unit 44. In one embodiment, the motor 18 and the generator 20 cooperate as part of a regenerative braking system in which both the motor 18 and the generator 20 can be employed as motors to output torque. For example, the motor 18 and the generator 20 can each output electrical power to the battery pack 14.

Referring now to FIGS. 2 to 5B, the example battery pack 14 provides a relatively high-voltage battery that stores generated electrical power and outputs electrical power to operate the motor 18, the generator 20, or both.

The battery pack 14 includes a plurality of arrays 60. Each of the arrays 60 includes a plurality of individual battery cells 64 held within a support structure 68. The battery cells 64 are distributed along an axis A. The support structure 68 can includes a frame about the perimeter of each of the battery cells 64. The support structure 68 can further include end walls 68'.

The battery cells 64 and support structure 68 are disposed on a cold plate 70. A coolant circulates through channels within the support structure 68 to carry thermal energy from the arrays 60.

The battery pack 14 includes a case 74 that houses the battery arrays 60. The case includes a lid 78 secured to a floor 82.

A plurality of twist-locks 86 secure the battery arrays 60 within the case 74. The example twist-locks 86 are attached directly to the floor 82. The twist-locks 86 are rotatable from a first position shown in FIGS. 4A and 4B to a second position shown in FIGS. 2, 5A, and 5B.

The battery arrays 60 are free to move relative to the floor 82 when the twist-locks 86 are in the first position. That is, the twist-locks 86 do not secure the battery arrays 60 when the twist-locks 86 are in the first position.

Rotating the twist-locks 86 to the second position secures the battery array 60 in an installed position within the case 74. In the installed position, the battery array 60 is in a final position within the case 74. The lid 78 and the floor 82 can then be secured, and the entire battery pack 14 secured to a vehicle.

In this example, the twist-locks 86 secure the battery arrays 60 to the floor 82. In another example, the twist-locks 86 secure the battery arrays 60 to another portion of the battery pack 14, such as the lid 78, or both the floor 82 and the lid 78.

Each of the example twist-locks 86 are secured to the floor 82 with a fastener 90. In this example, the twist-locks 86 are rotated between the first position and the second position during the securing of the fastener 90. In another example, the twist-locks 86 are moved between the first position and the second position by a tool or by hand. When the fastener 90 is fully seated an secured, twist-locks 86 in the second position cannot move back to the first position due to, for example, frictional forces between the fastener 90 and the twist-lock 86. If the fastener 90 is loosened, the twist-lock 86 can be moved back to the first position.

In general, twist-locks 86 include devices that rotate less than 360 degrees to move back and forth between a locking position and an unlocked position. In the example embodiment, the twist-locks 86 rotate 90 degrees to move back and forth between a locking position and an unlocked position. The twist lock 86 can be restricted in position by a positive stopper, which allows for adjusting the desired stop position.

To secure the arrays 60 within the battery pack 14, the example twist-locks 86, in a locking position, clamp a foot 94 of the support structure 68 against the floor 82 when the twist-locks 86 are in the installed position. Notably, the foot 94 of the example support structure 68 is recessed and does not extend laterally past a laterally outermost edge 98 of the arrays 60. Thus, the foot 94 does not require packaging space laterally beyond the outermost edge 98 of the support structure 68.

The twist-lock 86 has a width $W_{TL}$ that is less than a width $W_G$ of a gap G between the battery array 60 and an adjacent battery array 60. This facilitates moving the twist-lock 86 to an installed position within the battery pack 14.

During assembly, the battery arrays 60 are placed on the floor 82. The twist-locks 86 are then moved downward within the gap G to the floor 82. The twist-locks 86 could also be placed on the floor 82 prior to the battery arrays 60 to assist in positioning the battery arrays 60. A tool, such as a torque gun, is then moved into the gap G. The tool rotates the fastener 90 to secure the twist-lock 86 to the floor 82.

Rotating the fastener 90 also causes the twist-lock 86 to rotate from the first position to the second position, which clamps the foot 94 against the floor 82 and secures the battery array 60 in the installed position.

Figure 2:
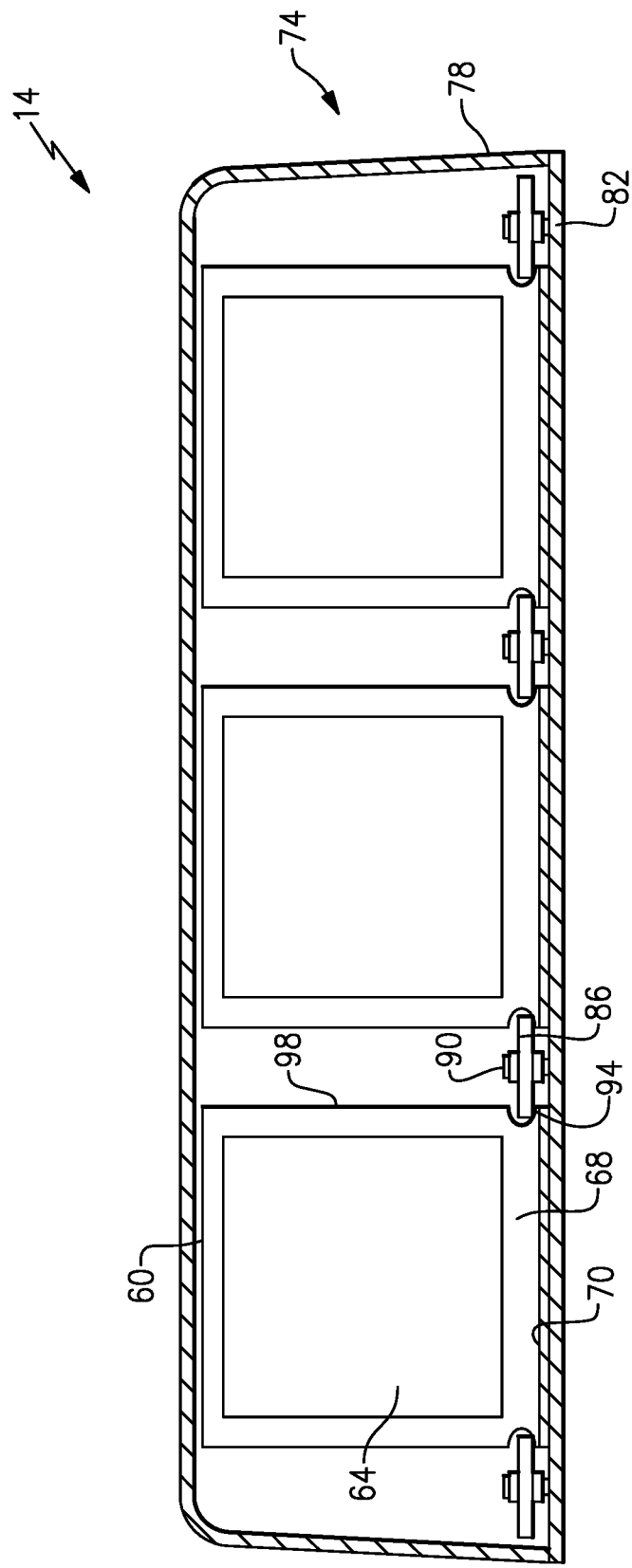
FIG. 2 is a schematic section view of the battery pack of FIG. 1.
Figure 3:
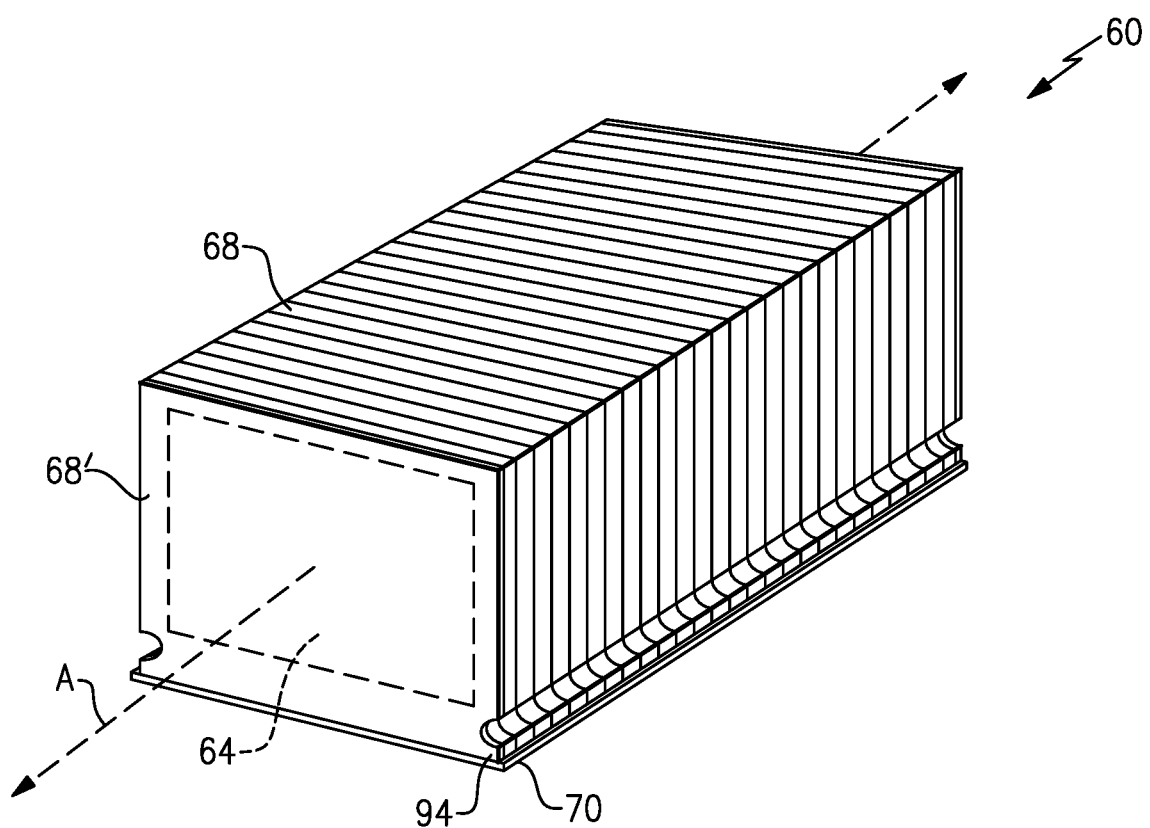
FIG. 3 shows a perspective view of an array of the battery pack of FIG. 2.
Figure 4A:
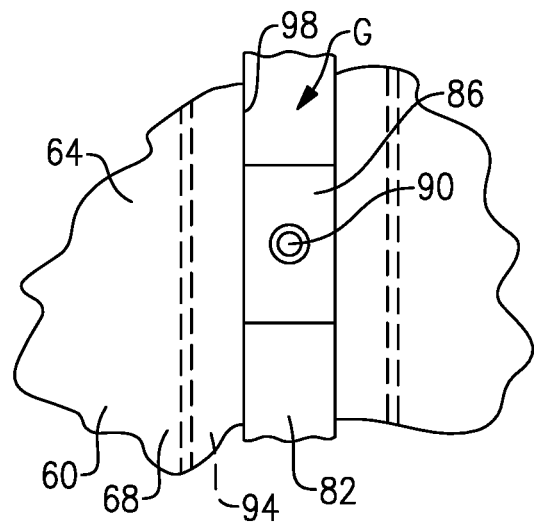
FIG. 4A illustrates a top view of a portion of the battery pack of FIG. 2 showing a twist-lock in a first position.
Figure 5A:
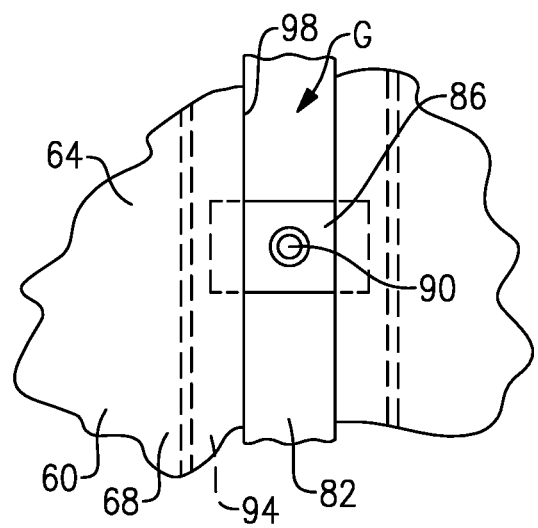
FIG. 5A shows a top view of the portion of the battery pack of FIG. 2 with the twist-lock rotated to a second position.
Figure 4B:
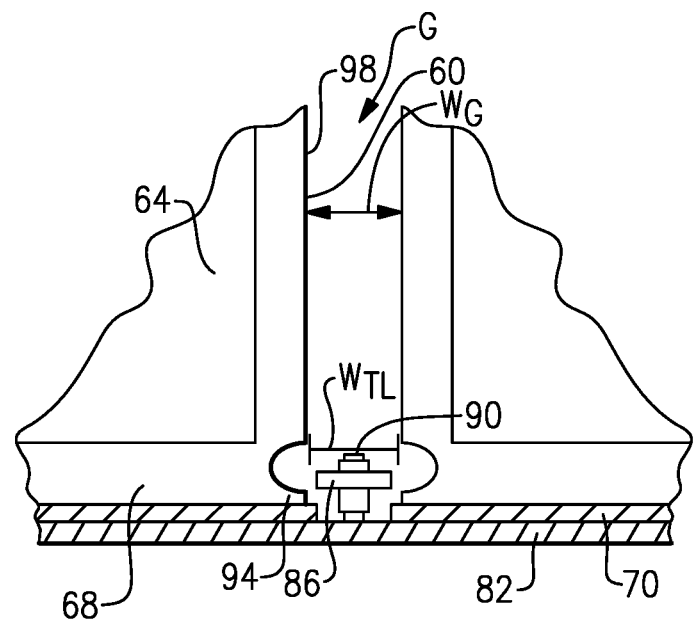
FIG. 4B shows a side view of the portion of the battery pack shown in FIG. 4A.
Figure 5B:
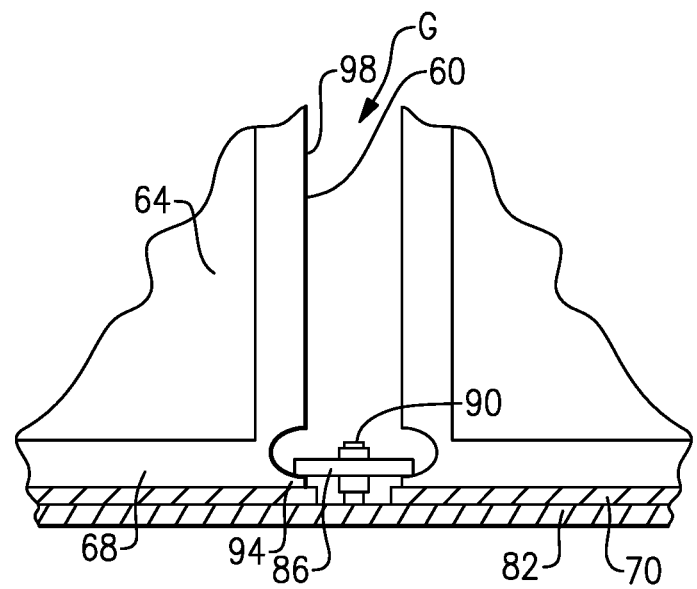
FIG. 5B shows a side view of the portion of the battery pack shown in FIG. 5A.
Figure 6:
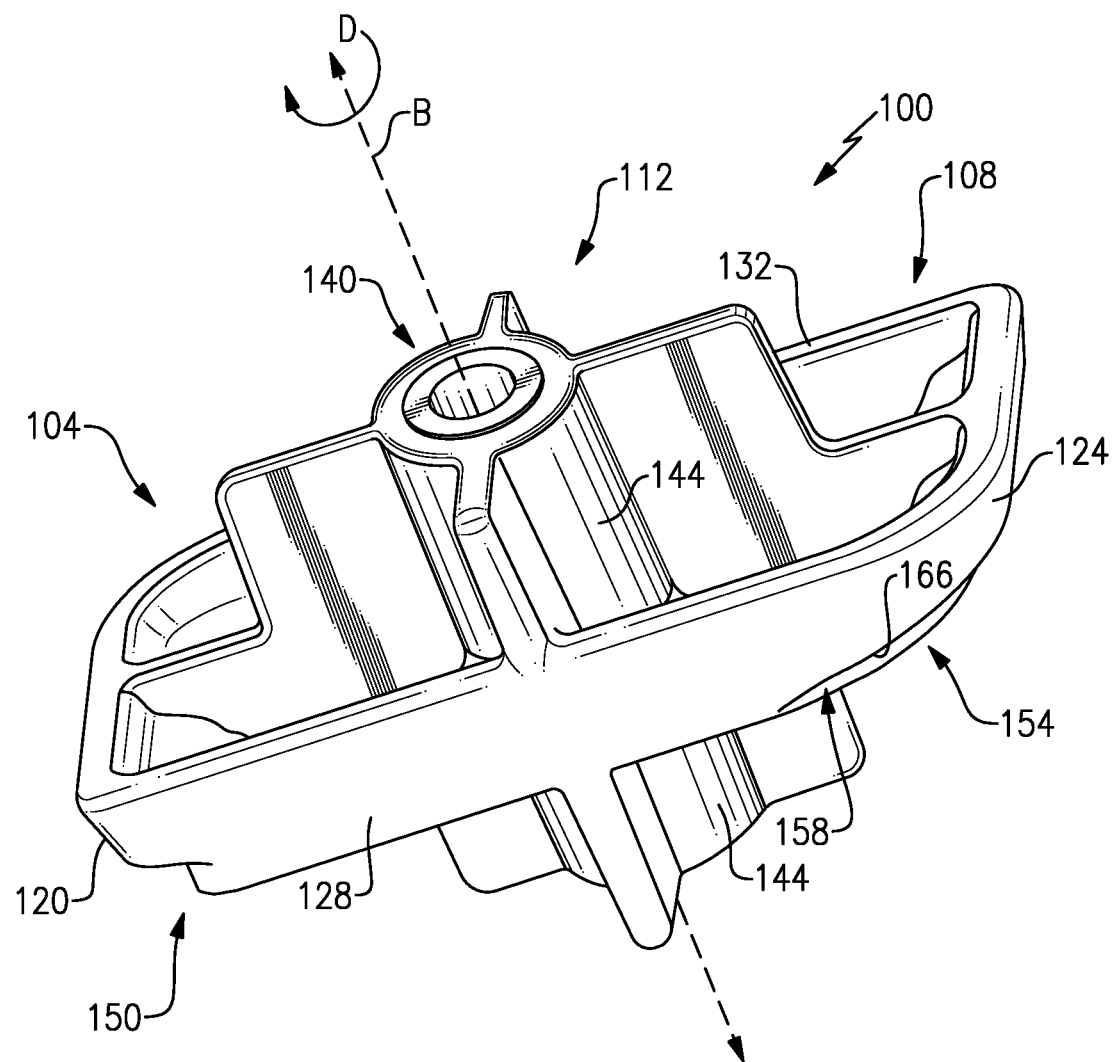
FIG. 6 shows a perspective view of another example twist-lock.
Figure 7:
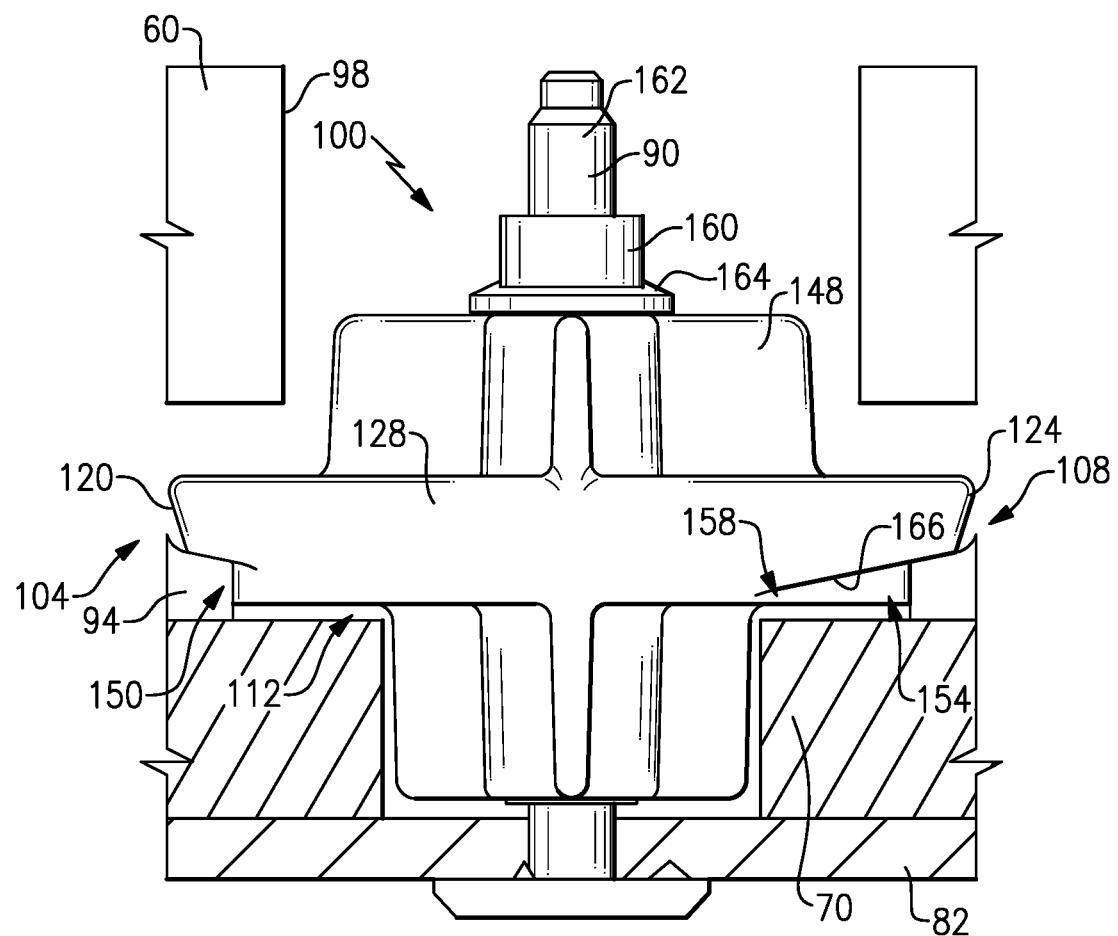
FIG. 7 shows a side view of the twist-lock of FIG. 6 within a battery pack.
Figure 8:
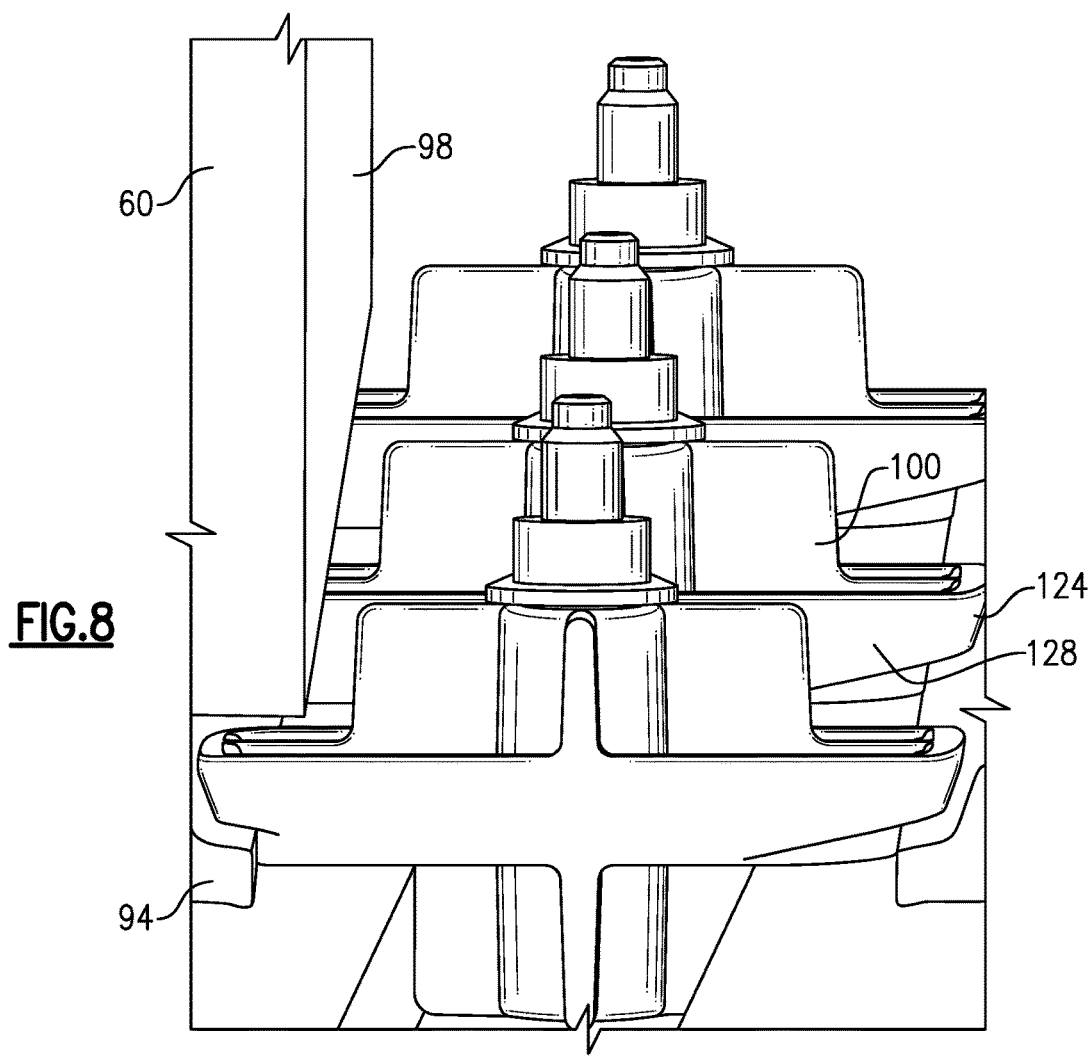
FIG. 8 shows a perspective view of the twist-lock of FIG. 6 within the battery pack of FIG. 7.
Figure 9:
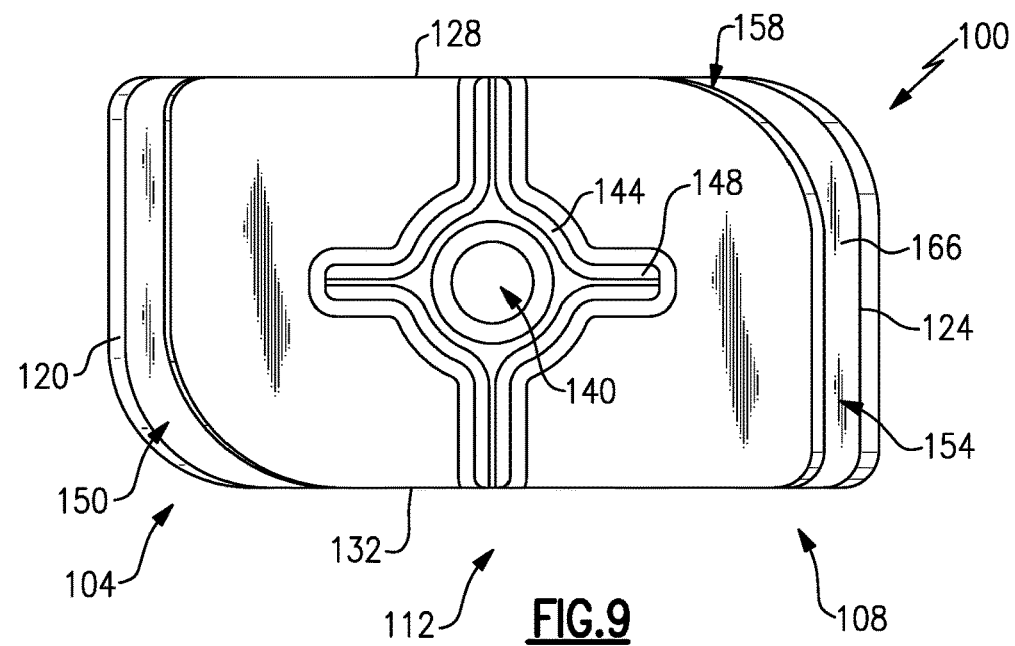
FIG. 9 shows a bottom view of the twist-lock of FIG. 6.

As shown in at least FIG. 2, some of the twist-locks 86 can secure the feet 94 of two separate arrays 60. Other twist-locks 86 can secure the foot 94 of one of the arrays 60.

Referring now to FIGS. 6 to 9, another example twist-lock 100 suitable for use in the battery pack 14 of FIG. 1 includes a first end section 104 and a second end section 108 extending from opposing sides of a body section 112. The first end section 104 terminates at a first end face 120 and the second end section 108 terminates at a second end face 124.

The twist-lock 100 further includes side surfaces 128 and 132 extending from the first end face 120 to the second end face 124. Portions of the side surfaces 128 and 132 are provided by the first end section 104, the second end section 108, and the body section 112.

The example body section 112 has an aperture 140 along an axis B. The aperture 140 receives the fastener 90 to secure the twist-lock 100 to the floor 82 of the battery pack 14.

A boss 144 of the main body section 112 provides the aperture 140 in this example. Fins 148 extend outwardly away from the boss 144 perpendicular to the axis B. In other examples, the fins do not extend radially from the boss 144. In this example, the boss 144 and the fins 148 extend axially past both the first end section 104 and the second end section 108.

The example twist-lock 100 includes a first groove 150 and a second groove 154. The first groove 150 extends across the first end face 120 to the side surface 132. The second groove 154 extends across the second end face 124 to the side surface 128. The dimensions of the grooves 150 and 154 are substantially the same. Along the first end face 120, the height of groove 150 is relatively consistent. Along the second end face 124, the height of the groove 154 is relatively consistent. Along the side 132, and optionally a portion of the end face 120, the first groove 150 tapers away from the first end face 120. The second groove 154 tapers away from the second end face 124. Along the side 132, and optionally a portion of the end face 120, the first groove 150 tapers away from the first end face 120.

The tapering of the grooves 150 and 154 facilitates movement of the twist-lock 100 from the first position to the second position. With respect to the groove 154, as the twist-lock 100 is rotated in a direction D from the first position to the second position, the twist-lock 100 first contacts the twist-lock 100 near a start 158 of the groove 154. As the twist-lock 100 continues to rotate, the foot F rides within the groove 154 along a downwardly facing surface 166 of the twist-lock 100. The angling of the surface 166 facilitates engaging from the first position to the second position.

In this example, the fastener 90 comprises a nut 160 and a bolt 162. The nut 160 is secured to the bolt 162 to both secure the twist-lock 100 to the floor 82 and rotate the twist-lock 100 from the first position to the second position.

The torque gun is used to rotate the nut 160 relative to the bolt 162. Rotating the nut 160 causes rotation of the twist-lock 100 from the first position to the second position. Contact between the foot F and the first end face within the groove 150 and the second end face 124 within the groove 154 prevents the twist-lock 100 from continuing to rotate past the second position.

The nut 160 may be a hex nut with a flange where the top of the twist-lock 100 is overmolded onto the bottom and sides of the nut flange. This allows the twist-lock 100 to retain the nut 160 in a captured fashion to simplify assembly. It also will tend to ensure the twist-lock 100 is rotating as the nut 160 is driven down. However, once the twist-lock end faces 150 and 154 are driven low enough during the secure operation to contact the "toe" of the foot 94, the resistance torque developed by this contact will cause the slightly over molded nut 160 to break free from the overmolded plastic and allow the nut 160 to continue to rotate down until the twist lock 100 is secured in place. This approach ensures that the twist-lock 100 is rotated until it fully engages the foot 94 rather than have the rotational motion prematurely arrested (before it has rotated the proper amount) due to friction developed between the bottom of the twist-lock 100 and the top of the tray 82. In this example, the twist-lock 100 fully engages the foot 94 when the first end face 120 and the second end face 124 are aligned with a respective foot 94.

Features of this invention include an attachment device that secures a battery array within a battery pack without requiring a component of the battery cells sticking out laterally beyond the battery cells.

Although the battery pack 14 is depicted as within an HEV, it should be understood that the concepts described herein are not limited to HEVs and could extend to vehicles, including other electrified vehicles, such as plug-in hybrid electric vehicles (PHEVs) and battery electric vehicles (BEVs).

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method of securing a battery array, comprising:
   attaching a twist-lock to a case; and
   securing a battery array to the case by rotating the twist-lock from a first position to a second position, the twist-lock in the second position securing the battery array by holding a portion of the battery array between the twist-lock and the case.

2. The method of claim 1, wherein the twist-lock in the first position permits movement of the battery array to and from an installed position within the case, and the twist-lock in the second position secures the battery array in the installed position.

3. The method of claim 1, wherein the battery array is a first battery array and the rotating further secures a second battery array to the case.

4. The method of claim 1, further comprising clamping a foot of the battery array against the case during the rotating.

5. The method of claim 1, wherein the twist-lock directly contacts the battery array during the securing.

6. The method of claim 1, wherein the battery array is clamped between the twist-lock and the case when the twist-lock is securing the battery array to the case.

7. The method of claim 1, wherein attaching the twist-lock to the case comprises attaching the twist-lock to a tray of the case.

8. The method of claim 1, wherein attaching the twist-lock to the case comprises positioning a fastener within an aperture of the twist-lock, the fastener separate and distinct from the twist-lock.

9. The method of claim 1, wherein the securing is after the attaching.

10. The method of claim 1, wherein the securing comprises positioning the portion of the battery array within a groove at an end of the twist-lock.

11. The method of claim 10, wherein the portion is a first portion of a first battery array, and the groove is at a first end of the twist-lock, and further comprising securing a second portion of a second battery array during the securing by positioning the second portion of the second battery array within another groove at a second end of the twist-lock, the first end opposite the second end.

12. The method of claim 10, wherein the portion is a foot.

13. A method of securing a battery array, comprising:
securing a twist-lock to a case; and
rotating the twist-lock from a first position to a second position where a portion of a battery array is clamped between the twist-lock and the case.

14. The method of claim 13, wherein the rotating is after the securing.

15. The method of claim 13, wherein the portion is received within a groove at an end of the twist-lock when the battery array is clamped between the twist-lock and the case.

16. The method of claim 13, wherein the securing comprises securing the twist-lock to a tray of the case.

17. The method of claim 13, wherein the portion is a foot.

18. The method of claim 17, wherein the foot is recessed entirely beneath a plurality of battery cells of the battery array.

19. The method of claim 13, wherein the twist-lock directly contacts the portion when in the second position.

20. The method of claim 13, wherein no portion of the battery array is positioned between case and the twist-lock when the twist-lock is in the first position such that the twist-lock in the first position permits movement of a battery array to and from an installed position within a battery pack.

* * * * *